(12) United States Patent
Calpito et al.

(10) Patent No.: US 12,100,864 B2
(45) Date of Patent: Sep. 24, 2024

(54) CONTINUOUS WIRE BONDS FOR BATTERY MODULE

(71) Applicant: Atieva, Inc., Newark, CA (US)

(72) Inventors: DodgieReigh M. Calpito, Fairfield, CA (US); James Hawkins, Fremont, CA (US); Ryan Simpson, Maricopa, AZ (US); Ben Carlson-Sypek, Chandler, AZ (US)

(73) Assignee: Atieva, Inc., Newark, CA (US)

( * ) Notice: Subject to any disclaimer, the term of this patent is extended or adjusted under 35 U.S.C. 154(b) by 109 days.

(21) Appl. No.: 17/651,474

(22) Filed: Feb. 17, 2022

(65) Prior Publication Data

US 2023/0261341 A1 Aug. 17, 2023

(51) Int. Cl.
*H01M 50/547* (2021.01)
*H01M 50/505* (2021.01)
*H01M 50/509* (2021.01)
*H01M 50/514* (2021.01)

(52) U.S. Cl.
CPC ....... *H01M 50/547* (2021.01); *H01M 50/505* (2021.01); *H01M 50/509* (2021.01); *H01M 50/514* (2021.01)

(58) Field of Classification Search
CPC ............................ H01M 50/50; H01M 50/598
See application file for complete search history.

(56) References Cited

U.S. PATENT DOCUMENTS

| | | | |
|---|---|---|---|
| 6,935,020 B2 | 8/2005 | Ikeda | |
| 6,960,899 B2 | 11/2005 | Kobayashi et al. | |
| 7,288,919 B2 | 10/2007 | Morita | |
| 7,638,977 B2 | 12/2009 | Park | |
| 8,092,932 B2 | 1/2012 | Phillips et al. | |
| 8,212,571 B2 | 7/2012 | Emori et al. | |
| 8,222,863 B2 | 7/2012 | Sakakibara | |
| 8,354,186 B2 | 1/2013 | Muis | |
| 8,536,826 B2 | 9/2013 | Hirokawa et al. | |
| 8,586,230 B2 | 11/2013 | Kim et al. | |

(Continued)

FOREIGN PATENT DOCUMENTS

| | | | |
|---|---|---|---|
| EP | 3855554 A1 | | 7/2021 |
| JP | 2018116775 A | * | 7/2018 |
| KR | 20190011096 A | | 2/2019 |

OTHER PUBLICATIONS

JP2018116775A_Machine Translation (Year: 2018).*

(Continued)

*Primary Examiner* — Haroon S. Sheikh
*Assistant Examiner* — Aryana Y. Ortiz
(74) *Attorney, Agent, or Firm* — Brake Hughes Bellermann LLP (57) ABSTRACT

A battery module comprises: electrochemical cells arranged in rows with terminals in a coplanar arrangement, wherein the electrochemical cells include a first cell and a second cell; a busbar including coplanar interleaved fingers, wherein the first and second cells are positioned on opposite sides of a first coplanar interleaved finger of the coplanar interleaved fingers; and a first bond wire having: (i) a first wire bond at a first terminal of the first cell, (ii) a second wire bond at a first terminal of the second cell, and (iii) a first intermediate wire bond at the first coplanar interleaved finger between the first and second wire bonds.

10 Claims, 6 Drawing Sheets

(56) References Cited

U.S. PATENT DOCUMENTS

| | | | |
|---|---|---|---|
| 8,920,955 B1* | 12/2014 | Chuang | H01M 10/653 |
| | | | 429/7 |
| 9,966,584 B2 | 5/2018 | Jan et al. | |
| 2012/0141852 A1 | 6/2012 | Eberhard et al. | |
| 2012/0164490 A1 | 6/2012 | Itoi et al. | |
| 2013/0052514 A1 | 2/2013 | Kim | |
| 2014/0255750 A1 | 9/2014 | Jan et al. | |
| 2017/0271643 A1 | 9/2017 | Wintner | |
| 2020/0411924 A1 | 12/2020 | Yun | |
| 2021/0203029 A1* | 7/2021 | Ahn | G01R 31/396 |

OTHER PUBLICATIONS

International Search Report and Written Opinion for PCT Application No. PCT/US2023/062388, mailed on May 22, 2023, 11 pages.

* cited by examiner

CONTINUOUS WIRE BONDS FOR BATTERY MODULE

TECHNICAL FIELD

This document relates to continuous wire bonds for a battery module.

BACKGROUND

In recent years, the world's transportation has begun a transition away from powertrains primarily driven by fossil fuels and toward more sustainable energy sources, chiefly among them electric motors powered by on-board energy storages. Vehicle makers are striving to increase efficiency and utility of such vehicles, including the performance of energy storages such as battery packs.

SUMMARY

In a first aspect, a battery module comprises: electrochemical cells arranged in rows with terminals in a coplanar arrangement, wherein the electrochemical cells include a first cell and a second cell; a busbar including coplanar interleaved fingers, wherein the first and second cells are positioned on opposite sides of a first coplanar interleaved finger of the coplanar interleaved fingers; and a first bond wire having: (i) a first wire bond at a first terminal of the first cell, (ii) a second wire bond at a first terminal of the second cell, and (iii) a first intermediate wire bond at the first coplanar interleaved finger between the first and second wire bonds.

Implementations can include any or all of the following features. The first terminal of the first cell, and the first terminal of the second cell, are center terminals. The first terminal of the first cell, and the first terminal of the second cell, are rim terminals. The first bond wire has multiple intermediate wire bonds at the first coplanar interleaved finger between the first and second wire bonds. The first bond wire returns to the first coplanar interleaved finger from the second wire bond. The electrochemical cells further include a third cell adjacent the first cell, wherein the third cell is positioned on a same side of the first coplanar interleaved finger as the first cell, and wherein the first bond wire returning to the first coplanar interleaved finger from the second wire bond continues from the first coplanar interleaved finger and has a third wire bond at a first terminal of the third cell, and has a second intermediate wire bond at the first coplanar interleaved finger, wherein the second intermediate wire bond is between the second and third wire bonds. The first bond wire returns to the first coplanar interleaved finger from the third wire bond. The electrochemical cells further include a fourth cell adjacent the second cell, wherein the fourth cell is positioned on a same side of the first coplanar interleaved finger as the second cell, and wherein the first bond wire returning to the first coplanar interleaved finger from the third wire bond continues from the first coplanar interleaved finger and has a fourth wire bond at a first terminal of the fourth cell, and has a third intermediate wire bond at the first coplanar interleaved finger, wherein the third intermediate wire bond is between the third and fourth wire bonds. The busbar further includes a second coplanar interleaved finger, wherein the second cell is adjacent the second coplanar interleaved finger, wherein the electrochemical cells further include a third cell, wherein the third cell is adjacent the second coplanar interleaved finger, wherein the second and third cells are positioned on opposite sides of the second coplanar interleaved finger, the battery module further comprising a second bond wire having: (i) a first wire bond at a first terminal of the second cell, (ii) a second wire bond at a first terminal of the third cell, and (iii) an intermediate wire bond at the second coplanar interleaved finger between the first and second wire bonds. The busbar further includes an edge coplanar finger on an opposite side of the first cell from the first coplanar interleaved finger, wherein the first cell is an edge cell in the battery module such that none of the electrochemical cells are positioned on an opposite side of the edge coplanar finger from the first cell, the battery module further comprising a second bond wire having: (i) a third wire bond at the edge coplanar finger, (ii) a fourth wire bond at the second edge coplanar finger, and (iii) an intermediate wire bond at a second terminal of the first cell, wherein the intermediate wire bond is between the first and second wire bonds.

In a second aspect, a method of forming electrical connections of a battery module having electrochemical cells arranged in rows with terminals in a coplanar arrangement, wherein the electrochemical cells include a first cell and a second cell, comprises: forming, on a first bond wire and using a wire bonder head, a first wire bond at a first terminal of the first cell; moving the wire bonder head from the first wire bond to a busbar including coplanar interleaved fingers, wherein the first and second cells are positioned on opposite sides of a first coplanar interleaved finger of the coplanar interleaved fingers; forming, on the first bond wire and using the wire bonder head, a first intermediate wire bond at the first coplanar interleaved finger; moving the wire bonder head from the first coplanar interleaved finger to a first terminal of the second cell; and forming, on the first bond wire and using the wire bonder head, a second wire bond at the first terminal of the second cell.

Implementations can include any or all of the following features. The first terminal of the first cell, and the first terminal of the second cell, are center terminals. The first terminal of the first cell, and the first terminal of the second cell, are edge terminals. The method further comprises forming multiple intermediate wire bonds at the first coplanar interleaved finger between the first and second wire bonds. The method further comprises returning the wire bonder head to the first coplanar interleaved finger from the second wire bond. The electrochemical cells further include a third cell adjacent the first cell, and wherein the third cell is positioned on a same side of the first coplanar interleaved finger as the first cell, the method further comprising: after returning the wire bonder head to the first coplanar interleaved finger from the second wire bond, forming, on the first bond wire and using the wire bonder head, a second intermediate wire bond at the first coplanar interleaved finger; after forming the second intermediate wire bond, moving the wire bonder head from the first coplanar interleaved finger to a first terminal of the third cell; and forming, on the first bond wire and using the wire bonder head, a third wire bond at the first terminal of the third cell, wherein the second intermediate wire bond is between the second and third wire bonds. The method further comprises returning the wire bonder head to the first coplanar interleaved finger from the third wire bond. The electrochemical cells further include a fourth cell adjacent the second cell, and wherein the fourth cell is positioned on a same side of the first coplanar interleaved finger as the second cell, the method further comprising: after returning the wire bonder head to the first coplanar interleaved finger from the third wire bond, forming, on the first bond wire and using the wire bonder head, a third intermediate wire bond at the first coplanar interleaved finger; after forming the third intermediate wire bond, moving the wire bonder head from the first coplanar interleaved finger to a first terminal of the fourth cell; and forming, on the first bond wire and using the wire bonder head, a fourth wire bond at the first terminal of the fourth cell, wherein the third intermediate wire bond is between the third and fourth wire bonds. The busbar further includes a second coplanar interleaved finger, wherein the second cell is adjacent the second coplanar interleaved finger, wherein the electrochemical cells further include a third cell, wherein the third cell is adjacent the second coplanar interleaved finger, wherein the second and third cells are positioned on opposite sides of the second coplanar interleaved finger, the method further comprising: forming, on a second bond wire and using the wire bonder head, a third wire bond at a second terminal of the second cell; moving the wire bonder head from the third wire bond to the second coplanar interleaved finger; forming, on the second bond wire and using the wire bonder head, a second intermediate wire bond at the second coplanar interleaved finger; moving the wire bonder head from the second coplanar interleaved finger to a second terminal of the third cell; and forming, on the second bond wire and using the wire bonder head, a fourth wire bond at the second terminal of the third cell. The busbar further includes an edge coplanar finger on an opposite side of the first cell from the first coplanar interleaved finger, wherein the first cell is an edge cell in the battery module such that none of the electrochemical cells are positioned on an opposite side of the edge coplanar finger from the first cell, the method further comprising: forming, on a second bond wire and using the wire bonder head, a first edge wire bond on the edge coplanar finger; moving the wire bonder head from the first edge wire bond to a second terminal of the first cell; forming, on the second bond wire and using the wire bonder head, a third wire bond at the second terminal of the first cell; moving the wire bonder head from the third wire bond to the edge coplanar finger; and forming, on the second bond wire and using the wire bonder head, a second edge wire bond at the edge coplanar finger.

BRIEF DESCRIPTION OF DRAWINGS

Like reference symbols in the various drawings indicate like elements.

DETAILED DESCRIPTION

This document describes examples of systems and techniques of simplifying and streamlining bond wire installation in battery modules by forming a bond wire that continues from a cell onto an intermediate busbar, and from there continues onto a next cell. This can be done between a pair of cells, or more than two cells arranged adjacent a busbar having the shape of a coplanar interleaved finger. The wire bonding machine can accomplish its task of building electrically conductive bonds more efficiently because it may not need to change direction (e.g., revert, or move sideways) as much as may be the case in most existing approaches.

Examples herein refer to forming a bond between two or more conductive materials. As used herein, a bond can be formed by any technique that joins the materials so that electric current can flow between them. Ultrasonic wire-bonding and/or laser wirebonding can be used, to name just two examples. A presence of a bond between materials indicates that the materials are electrically coupled to each other, which is here referred to as them being coupled.

Examples herein refer to electrochemical cells. As used herein, an electrochemical cell is a device that generates electrical energy from chemical reactions, or uses electrical energy to cause chemical reactions, or both. An electrochemical cell can include an electrolyte and two electrodes to store energy and deliver it when used. In some implementations, the electrochemical cell can be a rechargeable cell. For example, the electrochemical cell can be a lithium-ion cell. In some implementations, the electrochemical cell can act as a galvanic cell when being discharged, and as an electrolytic cell when being charged. The electrochemical cell can have at least one terminal for each of the electrodes. The terminals, or at least a portion thereof, can be positioned at one end of the electrolytic cell. For example, when the electrochemical cell has a cylindrical shape, one of the terminals can be provided in the center of the end of the cell, and the can that forms the cylinder can constitute the other terminal and therefore be present at the end as well. Other shapes of electrochemical cells can be used, including, but not limited to, prismatic shapes.

Examples herein refer to a battery module, which is an individual component configured for holding and managing multiple electrochemical cells during charging, storage, and use. The battery module can be intended as the sole power source for one or more loads (e.g., electric motors), or more than one battery module of the same or different type can be used. Two or more battery modules can be implemented in a system separately or as part of a larger energy storage unit. For example, a battery pack can include two or more battery modules of the same or different type. A battery module can include control circuitry for managing the charging, storage, and/or use of electrical energy in the electrochemical cells, or the battery module can be controlled by an external component. For example, a battery management system can be implemented on one or more circuit boards (e.g., a printed circuit board).

Examples herein refer to a busbar, and a battery module can have at least one busbar. The busbar is electrically conductive and is used for conducting electricity to the electrochemical cells when charging, or from the cells when discharging. The busbar is made of an electrically conductive material (e.g., metal) and has suitable dimensions considering the characteristics of the electrochemical cells and the intended use. In some implementations, the busbar comprises aluminum (e.g., an aluminum alloy). A busbar can be planar (e.g., flat) or can have one or more bends, depending on the shape and intended use of the battery module. The busbar can be configured for placing electrochemical cells in a serial arrangement, or in a parallel arrangement, or in a serial and parallel arrangement.

Examples herein refer to bond wires (e.g., ribbon bond wires, or ribbon wires, or other electrical conductors). As used herein, a bond wire can have any number of different geometries, and can include one or more materials having respective conductivities. For instance, a bond wire can be a single layered bond wire, or can be a multi-layered bond wire that has a plurality of layers each having a respective conductivity. In some implementations, a bond wire can be a ribbon wire having a rectangular cross-section and having one or more layers. The one or more layers can include one or more electrically conductive materials, such as one or more metals and/or metal alloys. A bond wire can include, but is not limited to, copper, aluminum, a copper alloy, an aluminum alloy, and/or a combination thereof. As used herein, a bond wire being coupled to a surface (e.g., a conductive surface, electrical contact surface, etc.) refers to the bond wire being electrically and/or physically coupled with that surface, unless otherwise indicated.

Examples herein refer to a top or a bottom. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
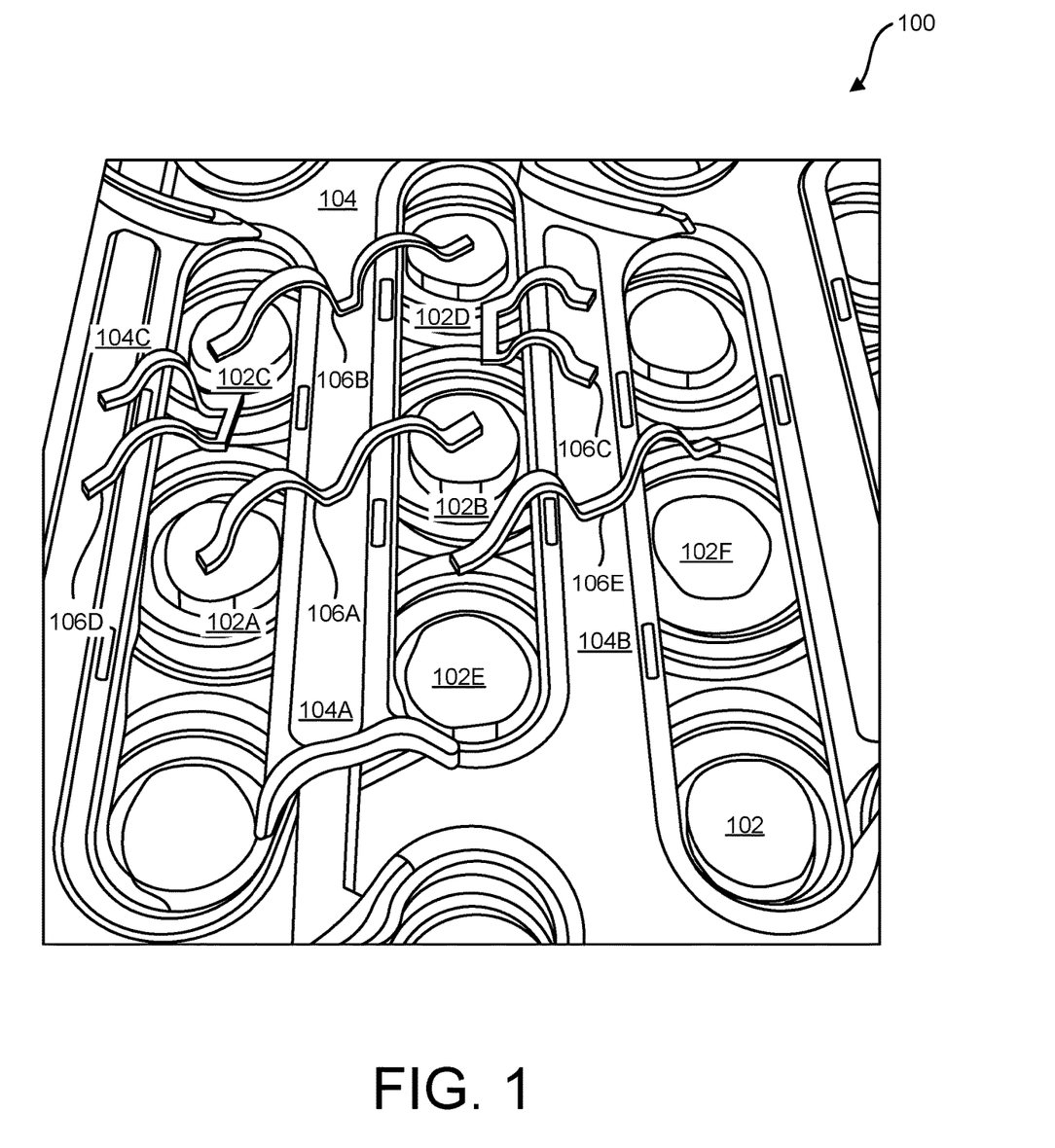
FIG. 1 shows a perspective view of an example of a battery module.

FIG. 1 shows a perspective view of an example of a battery module 100. The battery module 100 can be used with one or more other examples described elsewhere herein. The battery module 100 can include one or more housings and/or other surrounding or otherwise protective layers, which are omitted here for simplicity. Only a portion of the battery module 100 is shown in the present example.

The battery module 100 includes electrochemical cells 102 that can be arranged in rows within the battery module 100. Here, the battery module 100 includes cells 102A-102F among others. For example, the cells 102A and 102C can be arranged adjacent each other (e.g., in a row). As another example, the cells 102E, 102B, and 102D can be arranged adjacent each other (e.g., in a row). The electrochemical cells 102 can have any shape or form. Here, the electrochemical cells 102 are cylindrical and are arranged with their respective cylinder axes parallel to each other.

The electrochemical cells 102 can be arranged with terminals in a coplanar arrangement. Here, each of the cells 102A-102F includes a center terminal at an end surface of the cylindrical shape. For example, the center terminals can be positive terminals of the electrochemical cells 102. Here, each of the cells 102A-102F includes a rim terminal at the same end surface of the cylindrical shape where the center terminals are located. For example, the rim terminals can be negative terminals of the electrochemical cells 102. In some implementations, the center terminals and/or the rim terminals can be oriented in a coplanar arrangement with each other (e.g., as shown).

The battery module 100 includes a busbar 104 including coplanar fingers. Some of the coplanar fingers may be interleaved with each other. Here, the busbar 104 includes at least coplanar interleaved fingers 104A-104B that are interleaved with each other. The cells 102A-102B are positioned on opposite sides of the coplanar interleaved finger 104A. The cells 102C-102D are positioned on opposite sides of the coplanar interleaved finger 104A.

One or more of the coplanar fingers may be an edge coplanar finger. Here, the busbar 104 includes an edge coplanar finger 104C. The edge coplanar finger 104C is located on an opposite side of the cell 102A from the coplanar interleaved finger 104A. The cell 102A can be referred to as an edge cell in the battery module 100: for example, none of the electrochemical cells 102 are positioned on an opposite side of the edge coplanar finger 104C from the cell 102A.

The battery module 100 can include one or more bond wires. Here, bond wires 106A-106E are shown. For example, the bond wire 106A is coupled to the center terminal of the cell 102A, to the coplanar interleaved finger 104A, and to the center terminal of the cell 102B. As another example, the bond wire 106B is coupled to the center terminal of the cell 102C, to the coplanar interleaved finger 104A, and to the center terminal of the cell 102D. As another example, the bond wire 106C is coupled to the respective rim terminals of the cells 102B and 102D, and to the coplanar interleaved finger 104B. As another example, the bond wire 106D is coupled to the respective rim terminals of the cells 102A and 102C, and to the edge coplanar finger 104C. As another example, the bond wire 106E is coupled to the rim terminal of the cell 102E, to the coplanar interleaved finger 104B, and to the rim terminal of the cell 102F. Other approaches can be pursued.

The battery module 100 is an example of an electric component that includes electrochemical cells (e.g., the electrochemical cells 102) arranged in rows with terminals in a coplanar arrangement. The electrochemical cells include a first cell (e.g., the cell 102A) and a second cell (e.g., the cell 102B). The battery module includes a busbar (e.g., the busbar 104) including coplanar interleaved fingers, wherein the first and second cells are positioned on opposite sides of a first coplanar interleaved finger (e.g., the coplanar interleaved finger 104A) of the coplanar interleaved fingers. The battery module includes a first bond wire (e.g., the bond wire 106A) having: (i) a first wire bond at a first terminal of the first cell, (ii) a second wire bond at a first terminal of the second cell, and (iii) a first intermediate wire bond at the first coplanar interleaved finger between the first and second wire bonds.

Figure 2A:
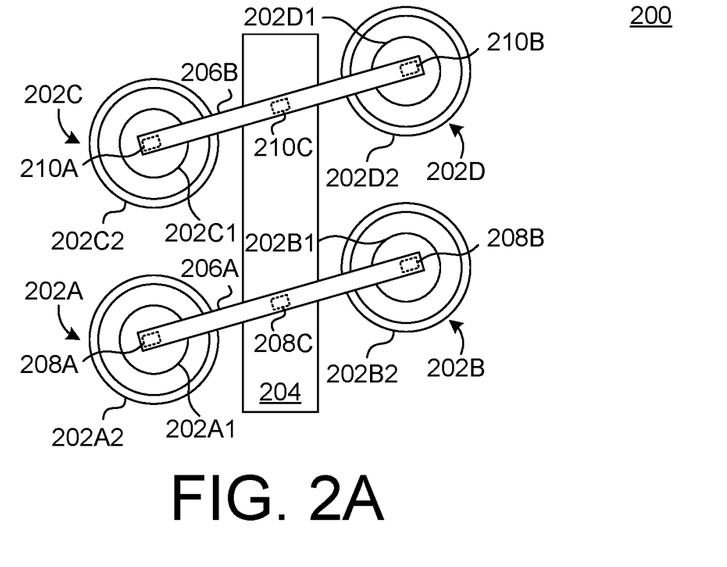
FIGS. 2A-2B show top views of examples of battery modules.
Figure 2B:
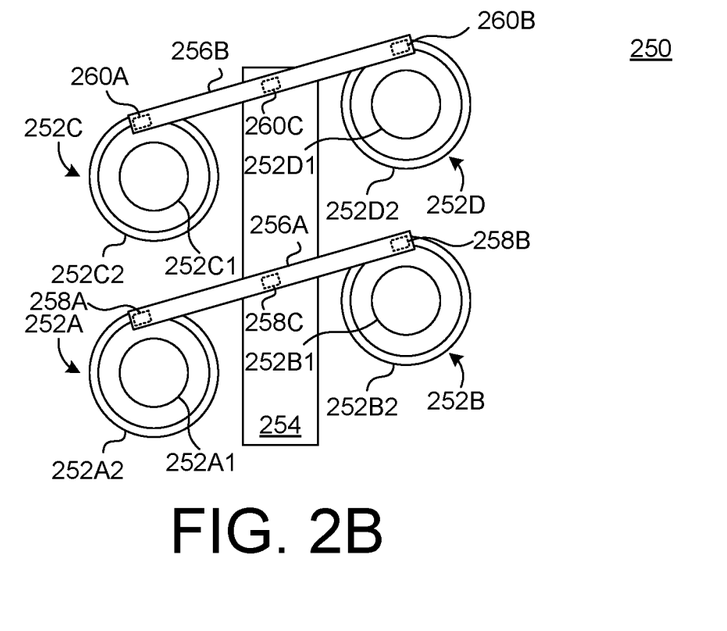

FIGS. 2A-2B show top views of examples of battery modules 200 and 250. The battery modules 200 and/or 250 can be used with one or more other examples described elsewhere herein. The battery module 200 includes cells 202A-202D and a busbar 204. In some implementations, the busbar 204 can be a coplanar interleaved finger of a larger busbar. For example, the cells 202A-202B are positioned on opposite sides of the busbar 204. As another example, the cells 202C-202D are positioned on opposite sides of the busbar 204. As another example, the cells 202A and 202C are adjacent each other. As another example, the cells 202B and 202D are adjacent each other.

Each of the cells 202A-202D can have multiple terminals. Here, the cells 202A-202D have terminals at least at one of their ends (e.g., the end of a cylindrical shape). The cell 202A can have a center terminal 202A1 (e.g., a positive terminal) and a rim terminal 202A2 (e.g., a negative terminal). The cell 202B can have a center terminal 202B1 (e.g., a positive terminal) and a rim terminal 202B2 (e.g., a negative terminal). The cell 202C can have a center terminal 202C1 (e.g., a positive terminal) and a rim terminal 202C2 (e.g., a negative terminal). The cell 202D can have a center terminal 202D1 (e.g., a positive terminal) and a rim terminal 202D2 (e.g., a negative terminal).

The battery module 200 can include one or more bond wires. Here, the battery module 200 includes a bond wire 206A that couples at least the cells 202A-202B to each other and to the busbar 204. The bond wire 206A has a wire bond 208A at the center terminal 202A1. The bond wire 206A has a wire bond 208B at the center terminal 202B1. The bond wire 206A has at least one intermediate wire bond 208C at the busbar 204 between the wire bonds 208A-208B. Here, the battery module 200 includes a bond wire 206B that couples at least the cells 202C-202D to each other and to the busbar 204. The bond wire 206B has a wire bond 210A at the center terminal 202C1. The bond wire 206B has a wire bond 210B at the center terminal 202D1. The bond wire 206B has at least one intermediate wire bond 210C at the busbar 204 between the wire bonds 210A-210B. Other approaches can be used.

The battery module 250 includes cells 252A-252D and a busbar 254. In some implementations, the busbar 254 can be a coplanar interleaved finger of a larger busbar. For example, the cells 252A-252B are positioned on opposite sides of the busbar 254. As another example, the cells 252C-252D are positioned on opposite sides of the busbar 254. As another example, the cells 252A and 252C are adjacent each other. As another example, the cells 252B and 252D are adjacent each other.

Each of the cells 252A-252D can have multiple terminals. Here, the cells 252A-252D have terminals at least at one of their ends (e.g., the end of a cylindrical shape). The cell 252A can have a center terminal 252A1 (e.g., a positive terminal) and a rim terminal 252A2 (e.g., a negative terminal). The cell 252B can have a center terminal 252B1 (e.g., a positive terminal) and a rim terminal 252B2 (e.g., a negative terminal). The cell 252C can have a center terminal 252C1 (e.g., a positive terminal) and a rim terminal 252C2 (e.g., a negative terminal). The cell 252D can have a center terminal 252D1 (e.g., a positive terminal) and a rim terminal 252D2 (e.g., a negative terminal).

The battery module 250 can include one or more bond wires. Here, the battery module 250 includes a bond wire 256A that couples at least the cells 252A-252B to each other and to the busbar 254. The bond wire 256A has a wire bond 258A at the center terminal 252A1. The bond wire 256A has a wire bond 258B at the center terminal 252B1. The bond wire 256A has at least one intermediate wire bond 258C at the busbar 254 between the wire bonds 258A-258B. Here, the battery module 250 includes a bond wire 256B that couples at least the cells 252C-252D to each other and to the busbar 254. The bond wire 256B has a wire bond 260A at the rim terminal 252C2. The bond wire 256B has a wire bond 260B at the rim terminal 252D2. The bond wire 256B has at least one intermediate wire bond 260C at the busbar 254 between the wire bonds 260A-260B. Other approaches can be used.

Figure 3:
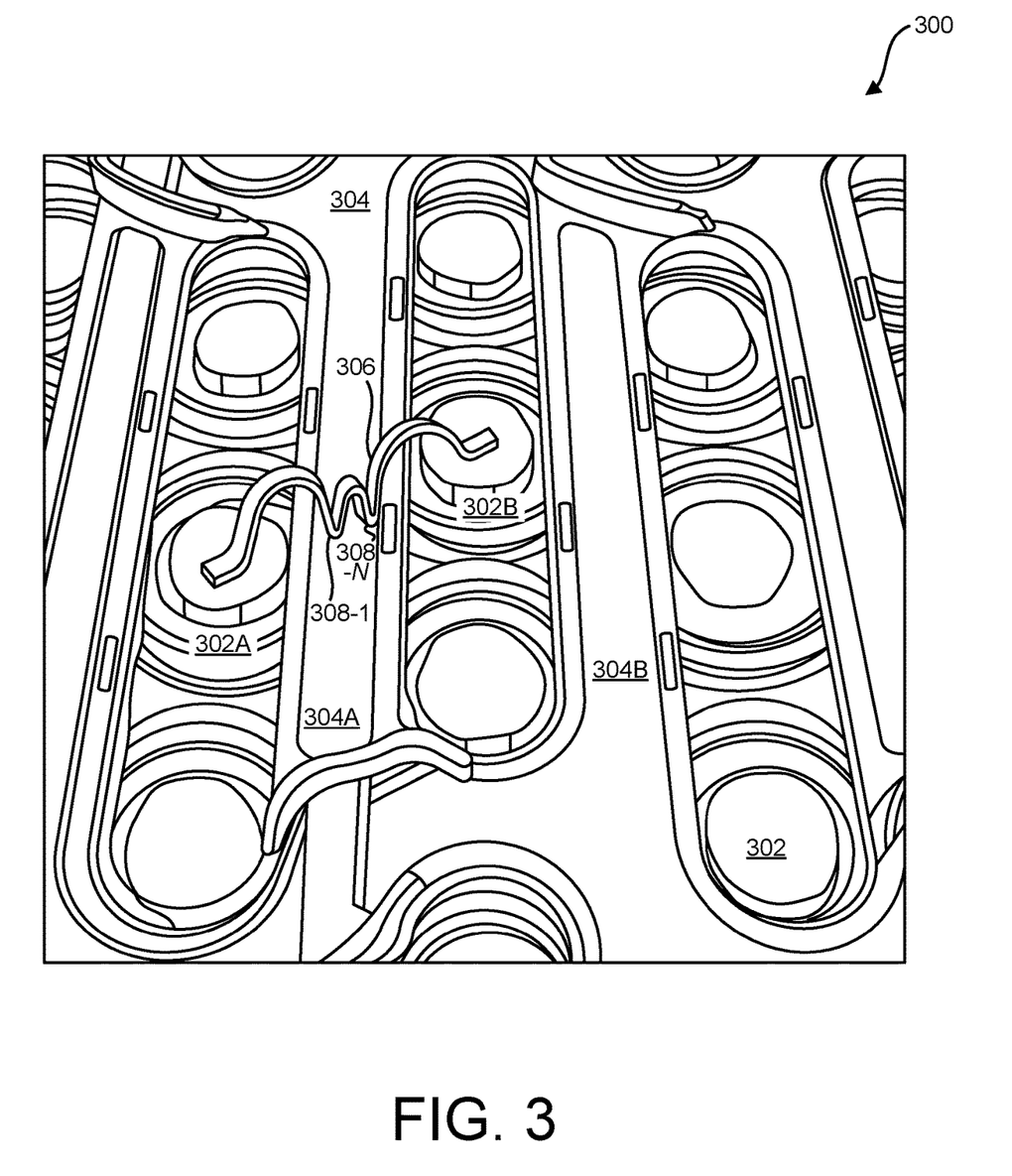
FIG. 3 shows a perspective view of another example of a battery module.

FIG. 3 shows a perspective view of another example of a battery module 300. The battery module 300 can be used with one or more other examples described elsewhere herein. The battery module 300 can include one or more housings and/or other surrounding or otherwise protective layers, which are omitted here for simplicity. Only a portion of the battery module 300 is shown in the present example.

The battery module 300 includes electrochemical cells 302 that can be arranged in rows within the battery module 300. Here, the battery module 300 includes cells 302A-302B among others. For example, the cells 302A and 302B can be arranged on opposite sides of a coplanar interleaved finger of a busbar. The electrochemical cells 302 can have any shape or form. Here. the electrochemical cells 302 are cylindrical and are arranged with their respective cylinder axes parallel to each other.

The electrochemical cells 302 can be arranged with terminals in a coplanar arrangement. Here, each of the cells 302A-302B includes a center terminal at an end surface of the cylindrical shape. For example, the center terminals can be positive terminals of the electrochemical cells 302. Here, each of the cells 302A-302B includes a rim terminal at the same end surface of the cylindrical shape as the center terminals. For example, the rim terminals can be negative terminals of the electrochemical cells 302. In some implementations, the center terminals and/or the rim terminals can be oriented in a coplanar arrangement (e.g., as shown).

The battery module 300 includes a busbar 304 including coplanar fingers. Some of the coplanar fingers may be interleaved with each other. Here, the busbar 304 includes coplanar interleaved fingers 304A-304B. For example, the cells 302A-302B are positioned on opposite sides of the coplanar interleaved finger 304A.

The battery module 300 can include one or more bond wires. Here, a bond wire 306 is shown. For example, the bond wire 306 is coupled to the center terminal of the cell 302A, to the busbar 304, and to the center terminal of the cell 302B. The bond wire 306 has a wire bond at the center terminal of the cell 302A. The bond wire 306 has a wire bond at the center terminal of the cell 302B. The bond wire 306 has at least one intermediate wire bond (e.g., multiple intermediate wire bonds) at the coplanar interleaved finger 304A between the respective wire bonds at the cells 302A-302B. The bond wire 306 can have an intermediate wire bond 308-1 and at least one additional intermediate wire bond, as here collectively represented by an intermediate wire bond 308-N, where N≥2. Other approaches can be used.

Figure 4:
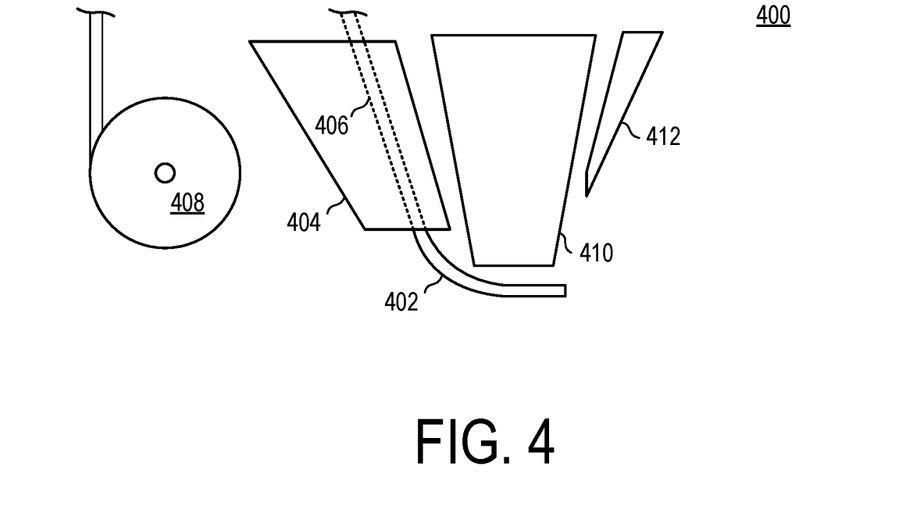
FIG. 4 shows an example of a wire bonder head that can be used in forming wire bonds.

FIG. 4 shows an example of a wire bonder head 400 that can be used in forming wire bonds. The wire bonder head 400 can operate using a supply of bond wire 402. The wire bonder head 400 and/or the bond wire 402 can be used with one or more other examples described elsewhere herein. The wire bonder head 400 includes a wireguide 404. The wireguide 404 is used for guiding (e.g., feeding) the bond wire 402 in a bonding operation. The wireguide 404 can be made of one or more materials, including, but not limited to, a metal or a synthetic material. A supply 406 of the bond wire 402 is seen as passing through the wireguide 404. In some implementations, the supply 406 of the bond wire 402 can be provided from a spool 408. For example, the spool 408 can be rotatably suspended in relation to the wire bonder head 400 so as to allow the supply 406 of the bond wire 402 to be obtained in a continuous or intermittent fashion, and such that the bond wire 402 has a particular orientation relative to an electrochemical cell for bonding.

The wire bonder head 400 includes a wedge 410. The wedge 410 can be used to bond the bond wire 402 to an electrochemical cell (not shown). For example, the wedge 410 can be made of metal.

The wire bonder head 400 includes a cutter 412. The cutter 412 can be used to sever the bond wire 402 before, during, or after bonding. For example, the cutter 412 can be made of metal.

Figure 5:
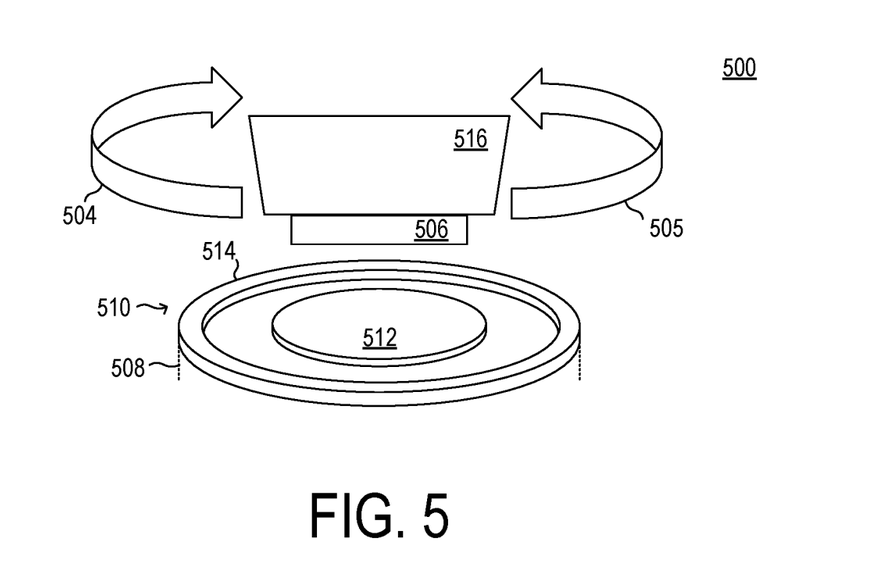
FIG. 5 schematically shows an example of a bond wire and a bonding operation.

FIG. 5 schematically shows an example 500 of a bond wire and a bonding operation. The example 500 or aspects thereof can be used with one or more other examples described elsewhere herein. The bonding operation of the example 500 can be used to perform wire bonding, such as in accordance with the example implementations described herein. Here, a bond wire 506 (e.g., a ribbon wire, bond wire, or wire) can be fed through a wedge wire bonder head, such that the bond wire 506 is disposed below a wedge 516. In some implementations, the wedge can include steel or another metal.

The bond wire 506 is shown in a frontal view where an end of the bond wire 506 is visible. A portion of an electrochemical cell 508 is shown; the electrochemical cell 508 can be included in a battery module. A bond to the electrochemical cell 508 can be formed in a wire bonding operation. Also shown in FIG. 5 are arrows 504 and 505 indicating, respectively, clockwise rotation of the wedge 516 (and an associated wedge bonder head) and counterclockwise rotation of the wedge 516. Such rotation can be used to change a direction of travel of the wedge 516 and a corresponding direction in which the bond wire 506 is fed or deployed when performing wire bonding operations.

In example implementations, the bond wire 506 can be shaped (e.g., as a result of forming wire bonds, wire loops or segments, and/or bends) to be suitable for its intended use of forming wire bonds between separate electric contact surfaces or conductive surfaces (e.g., any or all terminals and/or busbars described herein). In some implementations, the shape of the bond wire 506 can result from the process by which the bond wire 506 is installed to electrically connect the associated terminals or other conductive surfaces. In some implementations, the bond wire 506 can initially be kept as stock material on a spool, and a suitable length of the bond wire 506 can be installed to form wire bonding that provides an electrical connection between two or more conductive surfaces, thereby assuming a shape suitable for connecting those surfaces. For example, one or more non-planar segments of bond wire (sometimes referred to as a wire loop) can be formed between respective wire bonds formed on the conductive surfaces. Such non-planar segments can include, but are not limited to, bends for changing directions.

In the example 500, the bonding operation can include electrically bonding the bond wire 506 to a portion of the electrochemical cell 508 of a battery module. Here, only an end 510 of the electrochemical cell 508 is shown for simplicity. In some implementations, the end 510 can be referred to as a top of the electrochemical cell 508. For example, the electrochemical cell 508 may include a can (not shown) to hold active materials, and the end 510 can be formed by a cap that seals an opening of the can.

The electrochemical cell 508 can have multiple terminals. Here, a terminal 512 is shown as a structure positioned at a center of the end 510. For example, the terminal 512 can be a positive terminal of the electrochemical cell 508. Here, a rim 514 included in the end 510 is at least a part of another terminal of the electrochemical cell 508. For example, the rim 514 (and a remainder of the can material, including a bottom of the can) may serve as a negative terminal of the electrochemical cell 508. In such approaches, the terminal 512 and the rim 514 can be electrically insulated from one another.

The bonding operation can include use of one or more tools. In some implementations, such as those described herein, a wedge wire bonding head can be used, where the wedge 516 can be included in the wedge wire bonding head. For instance, in this example the wedge 516 can be used to bond the bond wire 506 to the terminal 512, or to the rim 514. In implementations, the wedge 516 can be made of metal. In implementations, after formation of a first wire bond, relative lateral translation between a battery module and the wedge 516 (and an associated bonder head, optionally including a rotation) can occur to facilitate formation of another wire bond at a different location. For example, the wedge bonder head can move to a subsequent electrical contact surface (e.g., another cell or a busbar), and the bond wire 506 (e.g., continuously extending from the previous wire bond) can be bonded to that subsequent electrical contact surface.

In some implementations, the bond wire 506 can, as part of a wire bonding operation, be wedge bonded to the rim 514 or the terminal 512 of the electrochemical cell 508. In such implementations, the bond wire 506 can have any appropriate orientation relative to the rim 514 or the terminal 512. For instance, in some implementations, the orientation of the bond wire 506 (e.g., a length of a corresponding bond wire segment) can be substantially radial relative to the rim 514 or the terminal 512. In other implementations, the bond wire 506 can be oriented substantially in a tangential direction relative to the rim 514 or the terminal 512. In still other implementations, other orientations of the bond wire 506 relative to the rim 514 or the terminal 512 can be used.

Figure 6:
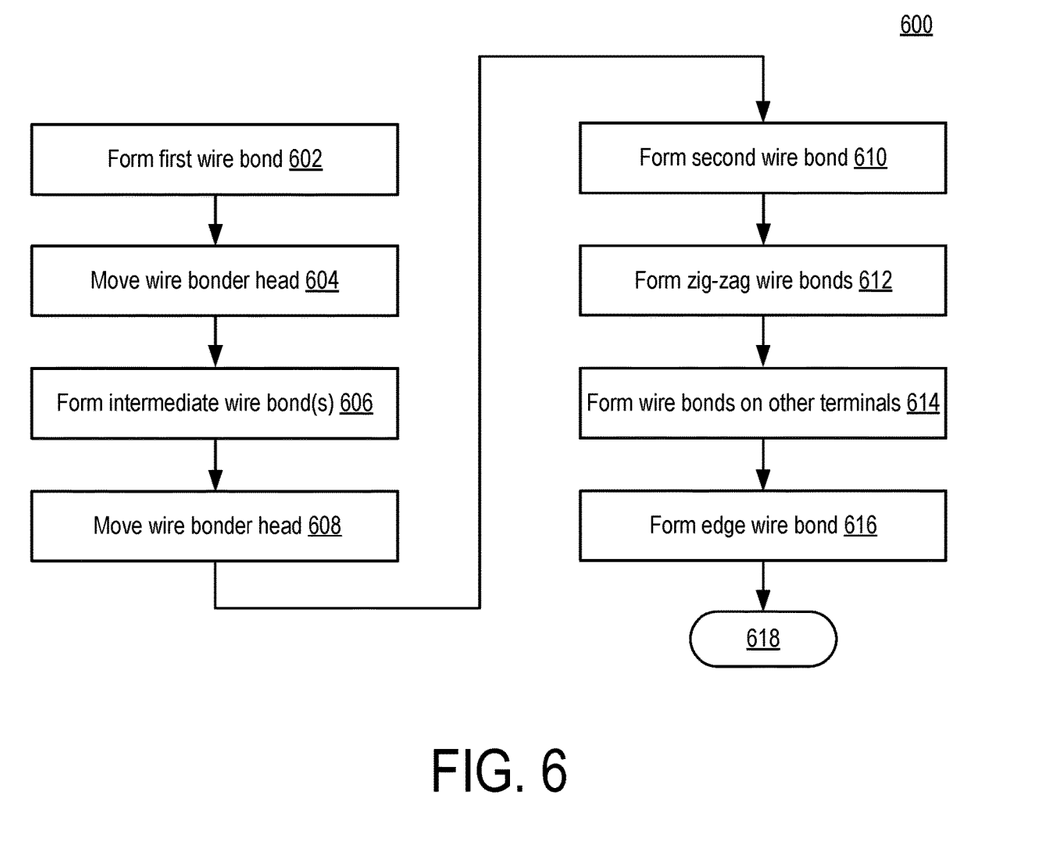
FIG. 6 shows an example of a method.

FIG. 6 shows an example of a method 600. The method 600 can be used with one or more other examples described elsewhere herein. More or fewer operations than shown can be performed. Two or more operations can be performed in a different order unless otherwise indicated.

At operation 602, the method 600 can include forming, on a first bond wire and using a wire bonder head, a first wire bond at a first terminal of the first cell. For example, the wire bond 208A or 258A (FIGS. 2A-2B) can be formed.

At operation 604, the method 600 can include moving the wire bonder head from the first wire bond to a busbar including coplanar interleaved fingers. The first and second cells can be positioned on opposite sides of a first coplanar interleaved finger of the coplanar interleaved fingers. For example, the wire bonder head can be moved to the busbar 204 or 254 (FIGS. 2A-2B).

At operation 606, the method 600 can include forming, on the first bond wire and using the wire bonder head, at least a first intermediate wire bond at the first coplanar interleaved finger. In some implementations, multiple intermediate wire bonds can be formed at the first coplanar interleaved finger. For example, the N number of intermediate wire bonds referred to as intermediate wire bonds 308-1 and 308-N (FIG. 3) can be formed.

At operation 608, the method 600 can include moving the wire bonder head from the first coplanar interleaved finger to a first terminal of the second cell. For example, the wire bonder head can be moved to the cell 202B or 252B (FIGS. 2A-2B).

At operation 610, the method 600 can include forming, on the first bond wire and using the wire bonder head, a second wire bond at the first terminal of the second cell. For example, the wire bond 208B or 258B (FIGS. 2A-2B) can be formed.

At operation 612, the method 600 can include forming a zig-zag pattern of wire bonds. For example, one or more of the wire bonds described below with reference to FIG. 7 can be formed.

At operation 614, the method 600 can include forming a wire bond at another terminal of one or more cells. For example, if the bond wire 206A were bonded by the operations 602-610, then in operation 614 the bond wire 256A can be bonded, or vice versa.

At operation 616, the method 600 can include forming one or more edge wire bonds. For example, the bond wire 106D can be bonded.

At operation 618, zero, one or more operations can be performed. In some implementations, the method 600 can end after performing some or all of the operations 602-616. In some implementations, some or all of the operations 602-616 can be performed at the operation(s) 618 regarding another cell or busbar. Other approaches can be used.

Figure 7:
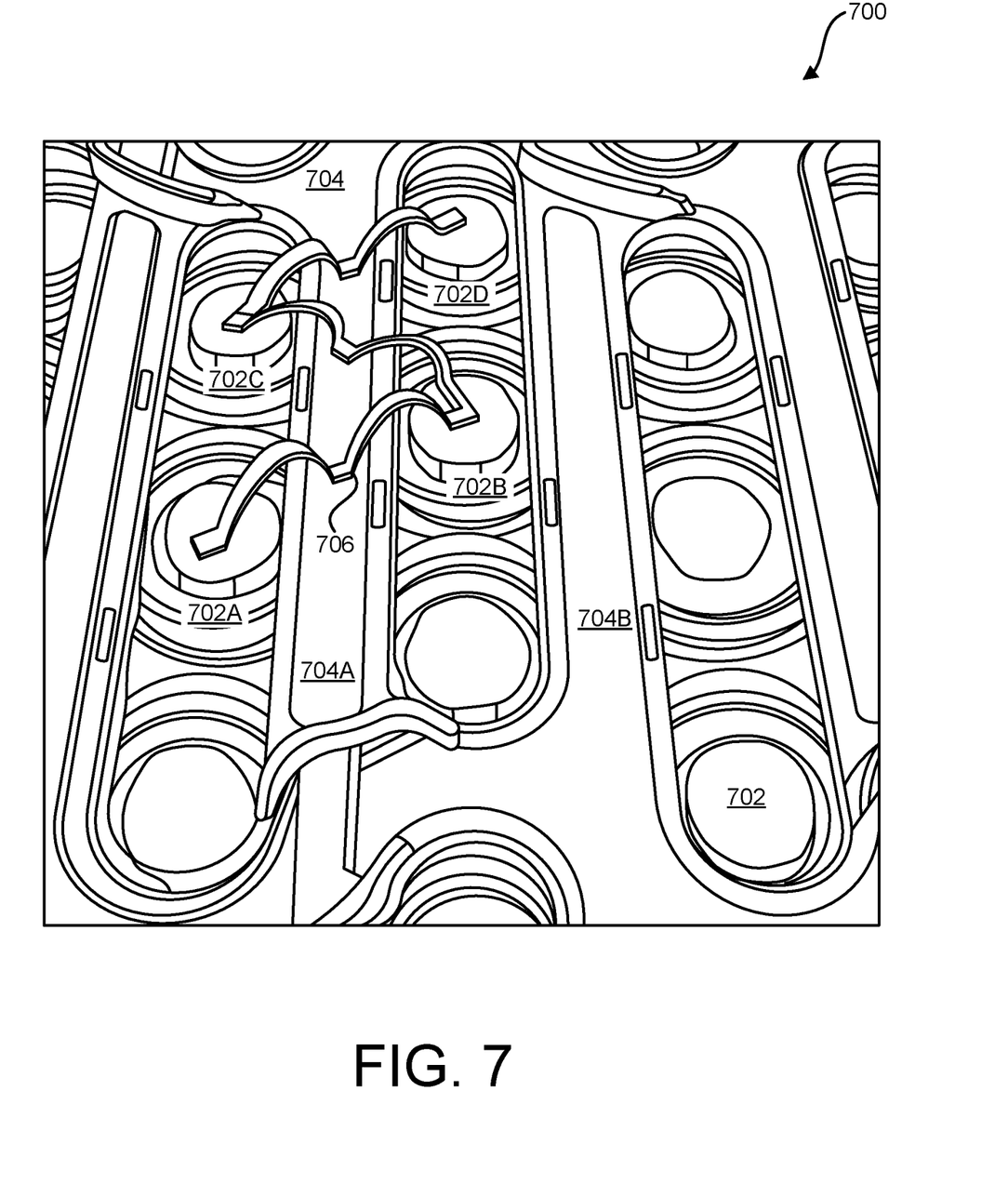
FIG. 7 shows a perspective view of another example of a battery module.

FIG. 7 shows a perspective view of another example of a battery module 700. The battery module 700 can be used with one or more other examples described elsewhere herein. The battery module 700 can include one or more housings and/or other surrounding or otherwise protective layers, which are omitted here for simplicity. Only a portion of the battery module 700 is shown in the present example.

The battery module 700 includes electrochemical cells 702 that can be arranged in rows within the battery module 700. Here, the battery module 700 includes cells 702A-D among others. For example, the cells 702A and 702C can be arranged adjacent each other (e.g., in a row). As another example, the cells 702B and 702D can be arranged adjacent each other (e.g., in a row). The electrochemical cells 702 can have any shape or form. Here, the electrochemical cells 702 are cylindrical and are arranged with their respective cylinder axes parallel to each other.

The electrochemical cells 702 can be arranged with terminals in a coplanar arrangement. Here, each of the cells 702A-702D includes a center terminal at an end surface of the cylindrical shape. For example, the center terminals can be positive terminals of the electrochemical cells 702. Here, each of the cells 702A-702D includes a rim terminal at the same end surface of the cylindrical shape as the center terminals. For example, the rim terminals can be negative terminals of the electrochemical cells 702. In some implementations, the center terminals and/or the rim terminals can be oriented in a coplanar arrangement (e.g., as shown).

The battery module 700 includes a busbar 704 including coplanar fingers. Some of the coplanar fingers may be interleaved with each other. Here, the busbar 704 includes coplanar interleaved fingers 704A-704B that are interleaved with each other. For example, the cells 702A-702B are positioned on opposite sides of the coplanar interleaved finger 704A. As another example, the cells 702C-702D are positioned on opposite sides of the coplanar interleaved finger 704A.

The battery module 700 can include one or more bond wires. Here, a bond wire 706 is shown. For example, the bond wire 706 is coupled to the center terminal of the cell 702A, is coupled to the coplanar interleaved finger 704A, is coupled to the center terminal of the cell 702B, returns and is again coupled to the coplanar interleaved finger 704A, is coupled to the center terminal of the cell 702C, again returns and is coupled to the coplanar interleaved finger 704A, and finally is coupled to the center terminal of the cell 702D. As such, the bond wire 706 forms a zig-zag pattern, centered on the coplanar interleaved finger 704A, with respect to the cells 702A-D. As such, the bond wire 706 can be installed based on a sequence of wire bonder operations that involve forming a bond, then moving the wedge, then forming another bond, and so on. In some implementations, the bond wire 706 can instead form a corresponding zig-zag pattern involving the rim terminals of some or all cells. In some implementations, zig-zag patterns can be used for the wire bonds of both the center terminals and the rim terminals. Other approaches can be used.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A battery module comprising:
electrochemical cells arranged in rows with terminals in a coplanar arrangement, wherein the electrochemical cells include a first cell and a second cell;
a busbar including coplanar interleaved fingers, wherein the first and second cells are positioned on opposite sides of a first coplanar interleaved finger of the coplanar interleaved fingers; and
a first bond wire having: (i) a first wire bond at a first terminal of the first cell, (ii) a second wire bond at a first terminal of the second cell, and (iii) a first intermediate wire bond at the first coplanar interleaved finger between the first and second wire bonds;
wherein the busbar further includes (i) a third cell having first and second terminals, and (ii) an edge coplanar finger on an opposite side of the first and third cells from the first coplanar interleaved finger, wherein the first and third cells are edge cells in the battery module such that none of the electrochemical cells are positioned on an opposite side of the edge coplanar finger from the first and third cells;
the battery module further comprising a second bond wire having: (i) a third wire bond at the edge coplanar finger, (ii) a fourth wire bond at the edge coplanar finger, (iii) a first intermediate wire bond at a second terminal of the first cell, and (iv) a second intermediate wire bond at the second terminal of the third cell, wherein the first and second intermediate wire bonds are between the third and fourth wire bonds of the second bond wire.

2. The battery module of claim 1, wherein the first terminal of the first cell, the first terminal of the second cell, and the first terminal of the third cell, are center terminals.

3. The battery module of claim 1, wherein the first terminal of the first cell, the first terminal of the second cell, and the first terminal of the third cell, are rim terminals.

4. The battery module of claim 1, wherein the first bond wire has multiple intermediate wire bonds at the first coplanar interleaved finger between the first and second wire bonds.

5. The battery module of claim 1, wherein the first bond wire returns to the first coplanar interleaved finger directly after the second wire bond.

6. The battery module of claim 5, wherein the third cell is positioned on a same side of the first coplanar interleaved finger as the first cell, and wherein the first bond wire returning to the first coplanar interleaved finger directly after the second wire bond continues from the first coplanar interleaved finger and has a third wire bond at the first terminal of the third cell, and has a second intermediate wire bond at the first coplanar interleaved finger, wherein the second intermediate wire bond is between the second and third wire bonds.

7. The battery module of claim 6, wherein the first bond wire returns to the first coplanar interleaved finger from the third wire bond.

8. The battery module of claim 7, wherein the electrochemical cells further include a fourth cell adjacent the second cell, wherein the fourth cell is positioned on a same side of the first coplanar interleaved finger as the second cell, and wherein the first bond wire returning to the first coplanar interleaved finger directly after the third wire bond continues from the first coplanar interleaved finger and has a fourth wire bond at a first terminal of the fourth cell, and has a third intermediate wire bond at the first coplanar interleaved finger, wherein the third intermediate wire bond is between the third and fourth wire bonds.

9. The battery module of claim 1, wherein the busbar further includes a second coplanar interleaved finger, wherein the second cell is adjacent the second coplanar interleaved finger, wherein the electrochemical cells further include a fourth cell and a fifth cell, wherein the fourth cell is adjacent the second coplanar interleaved finger on a same side of the second coplanar interleaved finger as the second cell, wherein the fifth cell is adjacent the second coplanar interleaved finger on an opposite side of the second coplanar interleaved finger from the fourth cell, the battery module further comprising a third bond wire having: (i) a fifth wire bond at a first terminal of the fourth cell, (ii) a sixth wire bond at a first terminal of the fifth cell, and (iii) a third intermediate wire bond at the second coplanar interleaved finger between the fifth and sixth wire bonds, wherein the first terminals of the fourth and fifth cells are a different type of terminal than the first terminals of the first and second cells.

10. The battery module of claim 9, wherein the first terminals of the fourth and fifth cells are rim terminals, and wherein the first terminals of the first and second cells are center terminals.

* * * * *